Oct. 7, 1924. 1,510,653
F. C. CARR
DISPENSING APPARATUS
Filed April 9, 1923 2 Sheets-Sheet 2
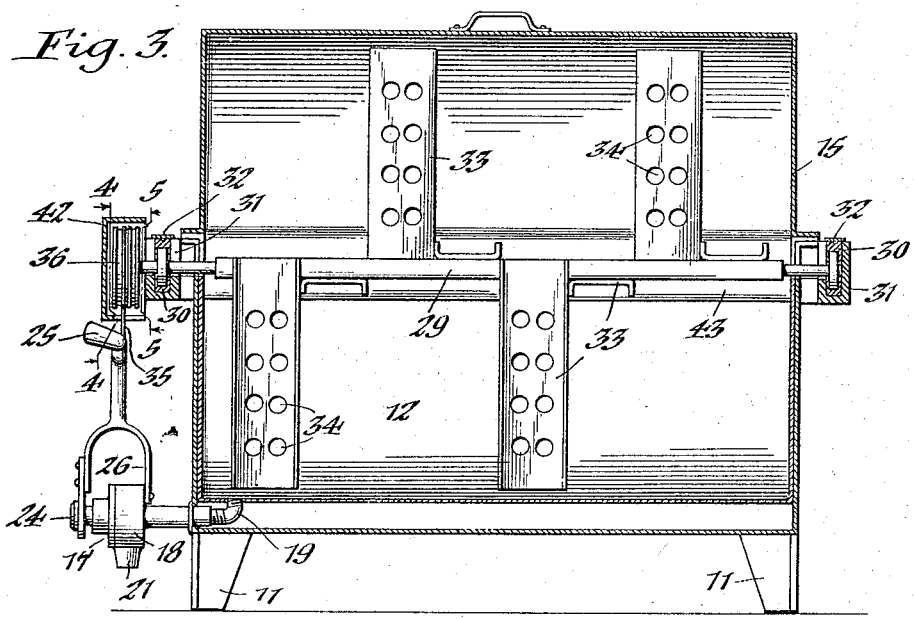
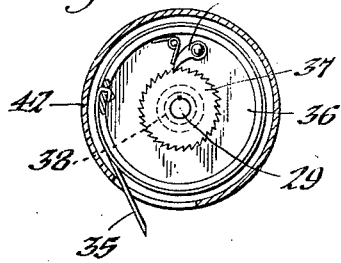
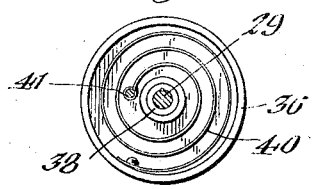
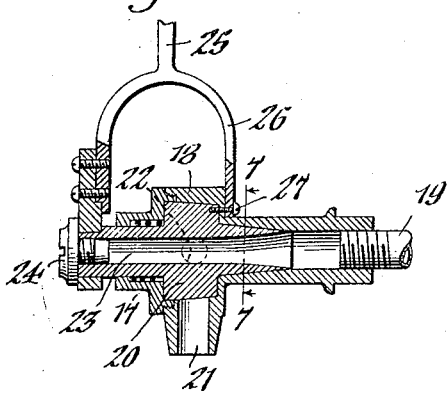
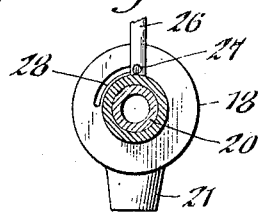
Inventor,
Frank C. Carr,
by Geyer & Popp
Attorneys.

Patented Oct. 7, 1924.

1,510,653

UNITED STATES PATENT OFFICE.

FRANK C. CARR, OF LOCKPORT, NEW YORK.

DISPENSING APPARATUS.

Application filed April 9, 1923. Serial No. 630,874.

*To all whom it may concern:*

Be it known that I, FRANK C. CARR, a citizen of the United States, residing in Lockport, in the county of Niagara and State of New York, have invented new and useful Improvements in Dispensing Apparatus, of which the following is a specification.

This invention relates to a dispensing apparatus which is more particularly adapted for use in restaurants, cafeterias and the like.

Its chief object is to provide a milk dispensing device of this character with improved means for automatically agitating or stirring the milk simultaneously with the act of operating the draw off valve or faucet, whereby the cream is thoroughly incorporated with the body of milk, insuring every customer a uniform glass of milk containing the proper percentage of butter fat.

A further object of the invention is to provide a dispensing apparatus which is simple and compact in construction, which is reliable and efficient in operation, and whose parts are so organized and constructed that they may be readily dismembered for cleaning purposes.

Figure 1:
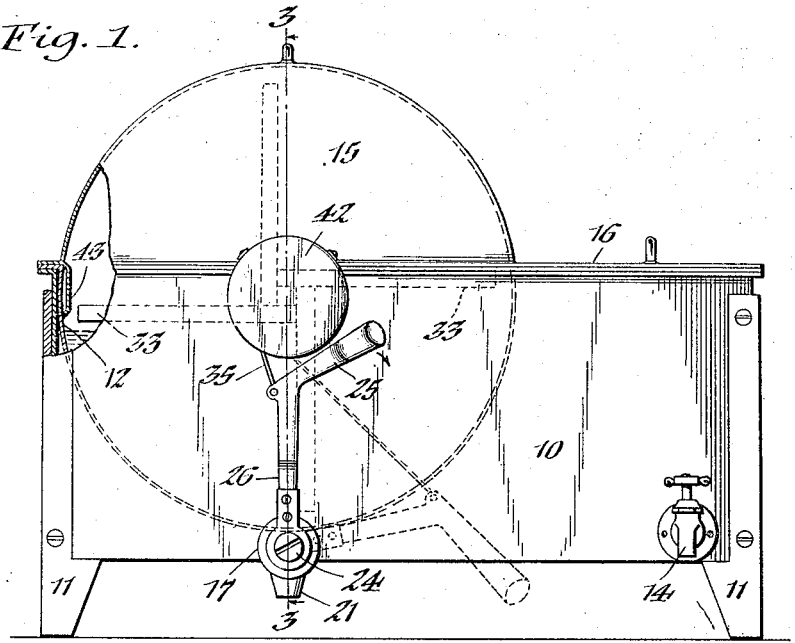
Figure 2:
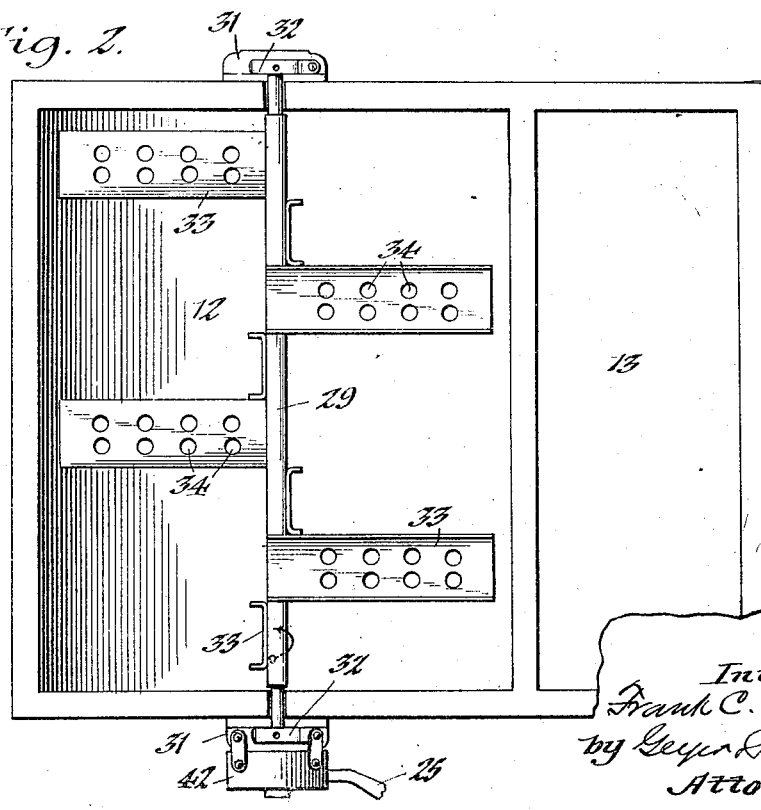

In the accompanying drawings: Figure 1 is a front view, partly in section, of a dispensing apparatus embodying my improvements. Figure 2 is a top plan view thereof with the covers removed. Figure 3 is a vertical longitudinal section taken in the plane of line 3—3, Fig. 1. Figures 4 and 5 are enlarged detail sectional views on the correspondingly numbered lines in Fig. 3. Figure 6 is an enlarged longitudinal section of the draw-off valve. Figure 7 is a transverse vertical section on line 7—7, Fig. 6.

Similar characters of reference refer to like parts throughout the several views.

10 indicates a casing or receptacle which may be of rectangular form and supported on legs 11. Suspended within this receptacle is a container or compartment 12 for the milk and adjoining the latter is an ice compartment 13 which may be provided with a faucet 14 for drawing off the water from time to time. These compartments are normally closed by covers 15, 16, the former being preferably semi-circular in form for a purpose which will hereinafter appear.

A faucet 17 for controlling the discharge of the milk is attached to the lower front side of the receptacle 10. This faucet may be of any appropriate construction, but as shown in Figs. 1, 3, 6 and 7, it comprises a body or casing 18 connected at its rear end to an elbow fitting 19 fastened to the bottom of the milk container 12 and a tubular valve 20 mounted in said casing and rotatable about a horizontal axis. The valve casing is provided with a discharge spout 21 and its valve is provided with a radial port 22 adapted to register therewith. The horizontal bore 23 of the valve extends from end to end thereof to facilitate cleaning thereof, its front end being provided with a screw plug or closure 24. A vertically-swinging handle 25, terminating at its lower end in a fork 26, is connected with the valve 20 for manipulating it. Said handle preferably has an operating stroke of approximately a quarter of a revolution and for this purpose one of the arms of the fork 26 is provided with a stop pin 27 attached to the valve and engaging an arcuate slot 28 in the valve-casing, the ends of said slot forming stops for limiting the movement of the operating handle in either direction.

Mounted within the container 12 is an agitating or stirring device which is operatively connected to the faucet-handle 25 for automatically actuating the same whenever said handle is oscillated. This agitating device preferably comprises a horizontal rock shaft 29 arranged centrally and transversely in the upper end of said milk container above the normal level of the milk and supported at its ends in bearing boxes 30 removably mounted in brackets 31 secured to the corresponding front and rear walls of the receptacle 10, as shown in Figs. 2 and 3. These bearing boxes are normally held in place by laterally-swinging spring plates 32 pivoted to the top of the respective brackets. Mounted on the rock shaft are a plurality of radial agitating blades or paddles 33 which are adapted to project into the contents of the container 12 and also into the semi-circular cover 15. As shown, these blades project alternately from different sides of the shaft and are provided with perforations 34 for insuring a thorough mixing of the container contents.

By this construction and arrangement of the agitating device, the cream is thoroughly incorporated with the body of the milk and the butter fat is caused to remain suspended in the milk rather than remain on the top of the milk. It will be noted that all the paddles are not wholly immersed in the milk container at any one time, some extending above the surface of the milk, so that upon rotating the shaft 29 the paddles alternately strike the surface of the container contents, thereby uniformly and effectively stirring the cream into the body of the milk.

The means for connecting the valve operating handle 25 with the agitating device preferably consists of a flexible member or cable 35 fastened at one end to said handle while its other end passes around and is fixed to a drum or pulley 36 mounted on the front end of the rock shaft 29. This pulley is so mounted that when the valve handle is turned downwardly motion is transmitted to the rock shaft while when said handle is moved upwardly the pulley rotates independently of said shaft. To accomplish this result, the front end of the latter has fixed thereon a ratchet wheel 37 upon the hub 38 of which the pulley 36 is freely mounted. A spring-pressed pawl 39 is fulcrumed on the web of the pulley and engages the ratchet wheel to compel the shaft 29 to turn therewith when the valve-handle is depressed. A helical spring 40 arranged within the rear side of the pulley and connected at one end to the flange thereof and at its other end to a stud 41 projecting from the corresponding bearing bracket 31 or other fixed pivot tends to return said handle to its initial position when released. During such return movement of the handle, the rock-shaft remains stationary by reason of the pawl passing freely over the teeth of the ratchet wheel. A suitable housing 42 may be arranged over the pulley to conceal the actuating mechanism.

It is to be noted that the agitating mechanism is readily removable to facilitate cleaning of the parts so as to render the device sanitary at all times.

As shown by dotted lines in Fig. 6, the valve port 22 is preferably located substantially 90° from the discharge spout 21 when the valve is closed. This permits the valve-handle to be oscillated a limited amount, without discharge of the container contents, for the purpose of agitating the latter preparatory to dispensing a quantity of it, this being especially advantageous if the contents has been standing for some time.

The cover 15 may be provided at its longitudinal sides with depending guard flanges 43 which fit snugly against the corresponding side walls of the container 12 and prevent the milk from splashing out of the same.

This improved dispensing apparatus results in a thorough agitation of the contents of the container simultaneously with the act of opening the faucet 17. Furthermore, the horizontally disposed agitating device forces the cream at the top of the container downwardly into the body of the milk, producing a mixture of uniform consistency and richness and insuring each and every customer a glass of milk containing the proper percentage of butter fat.

I claim as my invention:

1. A milk dispensing apparatus, comprising a container for the milk, a valve for controlling the discharge of milk from the container, a rotary agitating device arranged horizontally in said container, a handle for said valve movable in one direction to open the valve and in the opposite direction to close the valve, and means for connecting said handle with said agitating device, said means being constructed to render the agitating device operative when the valve-handle is moved in one direction and inoperative when moved in the reverse direction.

2. A milk dispensing apparatus, comprising a container for the milk, a valve for controlling the discharge of milk from the container, an agitating device arranged horizontally in said container, a handle for said valve movable manually in one direction, a flexible connection between said handle and said agitating device whereby the latter is actuated when the valve-handle is moved in the direction to open said valve, and means for causing the automatic return of said handle to its initial position.

3. A milk dispensing apparatus, comprising a container for the milk, a valve for controlling the discharge of the milk from the container, a rotary agitating device including a shaft arranged horizontally in said container, a handle for said valve, a pulley mounted on said shaft and including a ratchet mechanism, and a flexible connection fastened at one end to said valve-handle and at its other end to said pulley.

4. A milk dispensing apparatus, comprising a container for the milk, a valve for controlling the discharge of the milk from the container, an agitating device including a shaft arranged horizontally in said container, a handle for said valve, a pulley mounted on said shaft to turn therewith in one direction and movable independently thereof in the opposite direction, means connected to said valve-handle for actuating said pulley in the first-named direction simultaneously with the opening of said valve, and spring means applied to said pulley for reversing its movement upon the release of said handle.

5. A milk dispensing apparatus, comprising a container for the milk, a valve for controlling the discharge of milk from said container, a handle for said valve, an agitating device including a shaft arranged horizontally in said container, a ratchet wheel having a hub fixed on said shaft, a pulley journaled on said hub and carrying a pawl engaging said ratchet wheel, and a flexible connection fastened at one end to said valve handle and at its other end to said pulley.

6. A milk dispensing apparatus, comprising a casing containing a milk compartment, bearing brackets applied to the front and rear ends of said casing, a horizontal shaft journaled in said bearing brackets and provided with radial blades arranged to dip successively into the contents of said container, a valve for controlling the discharge of the milk from the container, a handle for said valve, a pulley mounted on said shaft to turn therewith in one direction and movable independently thereof in the opposite direction, a cable connected at one end to said valve-handle and it its other end to said pulley whereby said shaft is actuated simultaneously with the opening of said valve, and a spring applied to said pulley for reversing its movement when the valve-handle is released.

FRANK C. CARR.